United States Patent [19]

Roba

[11] Patent Number: 4,659,353

[45] Date of Patent: Apr. 21, 1987

[54] METHOD OF MAKING BIREFRINGENT OPTICAL FIBERS

[75] Inventor: Giacomo Roba, Cogoleto, Italy

[73] Assignee: Cselt - Centro Studi e Laboratori Telecomunicazioni S.p.A., Turin, Italy

[21] Appl. No.: 817,024

[22] Filed: Jan. 8, 1986

[30] Foreign Application Priority Data

Mar. 14, 1985 [IT] Italy .............................. 67254 A/85

[51] Int. Cl.$^4$ ...................... C03C 25/02; C03B 37/027
[52] U.S. Cl. ...................................... 65/3.12; 65/18.2; 427/163
[58] Field of Search .................. 65/2, 3.12, 3.11, 18.2; 427/163

[56] References Cited

U.S. PATENT DOCUMENTS

| | | | |
|---|---|---|---|
| 3,982,916 | 9/1976 | Miller | 65/3.12 |
| 4,360,371 | 11/1982 | Blankenship et al. | 65/3.12 |
| 4,428,761 | 1/1984 | Howard et al. | 65/3.12 |
| 4,578,097 | 3/1986 | Berkey | 65/3.11 |

*Primary Examiner*—Robert Lindsay
*Attorney, Agent, or Firm*—Karl F. Ross; Herbert Dubno

[57] ABSTRACT

The method uses a raw-material and dopant-deposition technique, which requires vapor-state reactants and thermal sources for producing a temperature gradient suited to obtain a circularly and radially varying refractive-index profile in the supporting tube.

2 Claims, No Drawings

METHOD OF MAKING BIREFRINGENT OPTICAL FIBERS

FIELD OF THE INVENTION

The present invention relates to a method of making transmission media for telecommunications systems using optical radiation and, more particularly, it concerns a method of fabricating birefringent optical fibers.

BACKGROUND OF THE INVENTION

Nowadays monomode optical fibers present very good optical characteristics, with attenuation practically coincident with the lowest limits intrinsically possible for the forming materials, in correspondence with the second transmission window, placed at about 1.3 μm wavelength. At this wavelength, monomode fibers having a simple refractive-index profile, of the step-index or depressed-index cladding type, present null chromatic dispersion and attenuation values of about 0.3 dB/km.

Thus, transmission systems operating at high transmission rates, e.g. 2 Gbit/s, may be realized with fiber trunks longer than 100 km and without intermediate repeaters. By way of example the memorandum entitled: "A 130 km transmission experiment at 2 Gb/s using silica-core fiber and a vapour phase transported DFB laser" by B. L. Kasper et al., contained in X.ECOC, Stuttgard 1984 PD-6 is worth mentioning.

Optimization of transmissive properties of silica, the material the optical fibers are made from, results more complex in correspondence with the third transmission window, placed at about 1.55 μm. In fact, at such wavelengths fibers present the lowest attenuation values (less than 0.2 dB/km), but at the same time their chromatic dispersion values are about 20 ps/nm·km.

The latter value highly limits the system bandwidth.

To overcome this disadvantage monomode fibers having guide structures with more complex refractive-index profiles (W, triangular, multiplecore) are being designed and tested.

With these structures systems operating with about 200 km repeater spacings and high transmission rate may be possibly implemented, even though difficulties in the simultaneous optimization of fibre attenuation and bandwidth, as a function of the refractive-index profile complexity, might arise.

The possibility exists of lengthening the repeater spacing, by increasing the transmission capacity by the use of coherent-type transmission systems. Notwithstanding, not to decrease the minimum detectable signal level, the output polarization state must be well defined and to correspond to that of the local oscillator. Which can be achieved by using either highly-birefringent fibers, such as to transmit a single-polarization state in the fundamental mode, or fibers having a reduced birefringent degree, but allowing a low coupling between the two polarization states of the fundamental mode.

Highly-birefringent fibers have already been proposed and fabricated: among them elliptic core, elliptic cladding, panda, and bowtie fibers are worth mentioning. In the elliptic-core type birefringence is induced by creating geometric asymmetry, i.e. the core presents an elliptic section propagating the radiation with a polarization plane parallel to the major ellipse axis. In the other fibers birefringence is generated by asymmetric stress. The method consists in applying a pressure to the core along a preferential direction. As a consequence the core refractive index undergoes a variation in the force direction, and hence the core develops to a high degreee, birefringence characteristics.

Nevertheless, both geometric and mechanical asymmetry introduce perturbations into the material structure, which perturbations affect the most critical fiber zone, i.e. the core-cladding interface.

Such perturbation causes a residual attenuation according to a phenomenon mostly apparent at high wavelengths, i.e. in the region where optical fibers present the lowest attenuation values.

The use of the third transmission window (1.55 μm) is indispensable for coherent-type transmission systems, both because at these wavelengths there are the lowest attenuation values, and because the conversion of the modal polarization state due to the natural Rayleigh scattering phenomenon (which is present when trunk lengths of the order of 100 km are considered) is less important at high wavelengths.

Said disadvantages are overcome by the method of fabricating birefringent optical fibers provided by the present invention, which allows the fabrication of monomode fibers with a certain degree of birefringence but without mechanical asymmetry or induced geometric asimmetry.

Besides, such a method allows the use of established methods of optical fiber preform fabrication. Thus considerable length fiber-trunks with homogeneous optical characteristics and not so liable to be affected by external perturbations may be produced.

The present invention provides a method of fabricating birefringent optical fibers wherein the silica used as raw material and germanium oxide used as dopant are obtained from high temperature synthesis from vapour-state reactants and are deposited inside a cylindrical supporting tube, characterized in that the refractive index profile is varied along the fiber circumference, not only along the radius, by varying in opposite direction the reaction temperature profile along the supporting tube circumference, minimum temperature values being higher than or equal to the temperature corresponding to maximum deposition efficiency of germanium oxide, under the speed and composition conditions of the mixture of vapour-state reactants under which the process develops.

The method of fabricating birefringent optical fibers exploits the property of germanium oxide, which dopant is the most-widely used to form optical-fiber cores, of having a whole implanting efficiency in the silica matrix dependent on temperature T, even at high-temperature values.

Empirically, in case of $SiCl_4 + GeCl_4$ and $O_2$ mixtures, silica presents a reaction efficiency $\eta_S$ of the type:

$$\eta_S = 1 - e^{-T/T_S}$$

As to germanium oxide, on the contrary, the reaction efficiency is given by relations $$\eta_G = 1 - e^{-T/\alpha T_o}$$

$$T < T_o$$

$$\eta_G = \eta_{G\infty} + e^{-T/\beta T_o}$$

$$T > T_o$$

where:

$T_o$ is the temperature at which dopant deposition efficiency has its maximum value;

$\eta_{G\infty}$ is the efficiency when the temperature tends to infinite.

The values of coefficients $T$, $T_o$, $\alpha$, $\beta$, $\eta_{G\infty}$ basically depend on gas composition and speed in the reactive mixture.

By MCVD technique, using a thermal source with circularly asymmetric temperature profile and minimum temperature higher than or equal to $T_o$, silica layers with constant thickness but circularly varying doping can be deposited in the supporting tube.

In this way, by successive layer deposition, the core composition can be both circularly and radially controlled and hence the refractive-index profile may be more freely built up.

In a typical process, with an $O_2$ flow of 1,400 cc/min and a reactant speed of 700 cm/min, the values of parameters $\alpha$, $\beta$, $\eta_{G\infty}$ are:

$\alpha \cong 0.9$ $\beta \cong 1.2$ $\eta_{G\infty} \cong 0.3$ and the temperature at which germanium oxide deposition efficiency is maximum is equal to 1500° C. Hence, it is sufficient to maintain minimum temperature values equal to the above-mentioned value, where higher dopant deposition is required, and higher values where less deposition is required, while silica deposition remains practically unchanged.

If, e.g. a thermal source with different temperatures $T'$, $T''$ on two orthogonal axes is used, and if $\eta'$, $\eta''$ are respectively germanium oxide implantation efficiencies at two temperatures, refractive-index variations on two orthgonal axes and hence numerical apertures $NA'$, $NA''$ are obtained which are in the following relation:

$$\frac{NA'}{NA''} = \left(\frac{\eta'}{\eta''}\right)^{\frac{1}{2}}$$

While choosing the circular temperature profile, geometry variations of the internal layers of deposited material are to be taken into account. These variations take place during the last collapsing phase. In fact, prior to collapsing a generic layer i has a radius given by the relation:

$$r_i = R - S\left[1 + \frac{(i+1)}{(N-1)}\right] ; i = 1, \ldots, N$$

where
R: supporting-tube external radius
S: supporting tube thickness
N: layer number.

Whilst, after collapsing, the new radius is given by relation $$r_i' = \left\{\frac{(N-i)}{(N-1)}(S+Nt) \cdot [2R(N-1) - (S+Nt)(N+i-2)]\right\}^{\frac{1}{2}}$$

where t is the thickness of each layer deposited.

It is clear that what described has been given by way of non limiting example. Modifications and variations are possible without going out of the scope of the invention.

I claim:

1. A method of making birefringent optical fibers, comprising the steps of:
   (a) vapor depositing within a cylindrical supporting tube silicon dioxide doped with germanium oxide produced by a high-temperature vapor-phase reaction in a succession of layers of selected thickness;
   (b) during the deposition of each of said layers maintaining a reaction temperature which varies along the circumference of the supporting tube and the surface along which the deposit is to form ranging from a maximum reaction temperature to a minimum reaction temperature and selected so that a refractive index profile is formed along the deposition circumference which varies inversely to the variation in the reaction temperature therealong;
   (c) maintaining said minimum reaction temperature so that it is at least equal to a temperature $T_o$ corresponding to a maximum deposition efficiency of germanium oxide under the speed and composition conditions of a mixture of vapor-state reactants from which the deposition occurs, the successive layers further varying the refractive index profile in a radial direction with respect to said tube;
   (d) thereafter collapsing said tube; and
   (e) drawing a birefringent optical fiber from the collapsed tube.

2. The method defined in claim 1 wherein in step (b) around said supporting tube circumference a temperature profile is generated with a maximum value along a first diameter and minimum value along a diameter orthogonal to said first diameter so that preferential dopant deposition occurs along an axis.

* * * * *